United States Patent [19]

Klatte et al.

[11] Patent Number: 4,801,047

[45] Date of Patent: Jan. 31, 1989

[54] DISPENSING DEVICE FOR RADIONUCLIDE GENERATORS

[75] Inventors: Bernd Klatte, Regensburg; Vencenzo Ferme, Waldetzberg; Fritz Herrmann, Rotgau; Hans-Gerd Hebborn, Donaustauf; Oskana Poliwczyk, Regensburg, all of Fed. Rep. of Germany

[73] Assignee: E. R. Squibb & Sons, Inc., Princeton, N.J.

[21] Appl. No.: 83,765

[22] Filed: Aug. 10, 1987

[30] Foreign Application Priority Data

Aug. 11, 1986 [DE] Fed. Rep. of Germany ... 8621529[U]

[51] Int. Cl.⁴ ............................................ G01F 11/28

[52] U.S. Cl. .................................. 222/163; 222/282; 222/400.7; 222/464

[58] Field of Search .................. 222/82, 83, 83.5, 163, 222/160, 282, 285, 325, 400.7, 464; 250/428, 430

[56] References Cited

U.S. PATENT DOCUMENTS

| | | | |
|---|---|---|---|
| 1,973,167 | 9/1934 | Heine | 222/160 |
| 3,438,549 | 4/1969 | Ritz | 222/83.5 |
| 3,774,036 | 11/1973 | Litt | 250/430 |
| 3,848,773 | 11/1974 | Adler et al. | 222/1 |
| 4,041,317 | 8/1977 | Morcos et al. | 260/432 PD |
| 4,131,217 | 12/1978 | Sandegren | 222/83.5 X |
| 4,192,438 | 3/1980 | Foster et al. | 222/5 |
| 4,197,942 | 4/1980 | Gacki et al. | 222/83 X |
| 4,203,443 | 5/1980 | Genese | 222/83 X |
| 4,239,970 | 12/1980 | Eckhardt et al. | 250/432 PD |
| 4,565,301 | 1/1986 | Hubbard et al. | 222/325 X |

FOREIGN PATENT DOCUMENTS

| | | |
|---|---|---|
| 2236565 | 2/1974 | Fed. Rep. of Germany . |
| 7708973 | 3/1977 | Fed. Rep. of Germany . |

*Primary Examiner*—Michael S. Huppert
*Assistant Examiner*—Nils E. Pedersen
*Attorney, Agent, or Firm*—Lawrence S. Levinson; Robert E. Lee, Jr.

[57] ABSTRACT

A dispensing device for a radionuclide generator includes an eluant container, a receptacle for receiving the container, the receptacle being in sliding engagement with a support, a hollow needle which pierces the elastic stopper of the container so that the tip of the needle penetrates into the container, and a fixing device for holding the needle at a distance from its tip. The volume dispensed from the container is controlled by shifting the receptacle up or down within the support along the longitudinal axis of the needle.

14 Claims, 1 Drawing Sheet

DISPENSING DEVICE FOR RADIONUCLIDE GENERATORS

BACKGROUND OF THE INVENTION

The invention refers to a dispensing device, in particular for radionuclide generators.

Nuclide generators are used for producing radionuclides. They are essentially composed of a generator column on the matrix of which a longer-lived initial stage of the desired radionuclide, the so-called parent nuclide, is fixed, of an eluant container, and of an eluate container. The single components are connected to each other via hollow needles. The short-lived radionuclide, the so-called daughter nuclide, is produced by the elution of the mother nuclide.

In the nuclide generator disclosed in German Utility Model No. 77 08 973, the eluate, which can be a physiological salt solution, in the eluant container, is suctioned through the generator column by means of the evacuated eluate container. Thus the amount of eluate obtained corresponds to the vacuum which prevails in the eluate container at the beginning of the process. The disadvantage of this arrangement is that it is not possible to exactly dispense the amount of eluate obtained.

German published, examined application No. 22 36 565 discloses a device composed of a generator column, transporting means, an eluant container and an eluate container. This device enables arbitrary transportation of any amount of eluate into the eluate container. In doing so, transport means—for example a hose pump whose pumping capacity, i.e. the amount of liquid per time unit, is known—are operated for a certain period of time according to the desired yield of eluate. The transport means and its control means necessary for this purpose are highly complex and thus expensive, especially when used for precise measuring.

In contrast to the prior art, the present invention is based on the object of providing a simple dispensing system by means of which in particular the elution of a radionuclide generator column with variable, arbitrarily choosable volumes of the fluid is possible.

This object is solved by the features of the claimed invention.

SUMMARY OF THE INVENTION

The invention is based on the idea of limiting the amount of eluant available for the elution. It is thereby possible to precisely adjust the yield of eluate, in particular in a radionuclide generator in which elution is performed via a small, evacuated collecting bottle, i.e. the eluate container.

The dispensing device according to the invention comprises an eluant container and at least one hollow needle the tip of which projects into the eluant container. The dispensing is best performed by choosing the piercing depth of the needle to which the tip projects into the eluant container in such a manner that only the desired volume of the liquid is available for the elution.

The dispensing device according to the invention comprises a receptacle adapted to the form of the eluant container, a fixing device which holds the needle at a distance from its tip and a shifting device. The receptacle and the fixing device are arranged shiftably towards each other with the shifting device. The receptacle and the fixing device are movable relative to each other between an upper and a lower end position in the axial direction of the needle. In the lower end position the tip of the needle projects approximately to the bottom of the eluant container. In the upper end position the tip of the needle projects only slightly into the eluant container.

According to a preferred embodiment of the invention, the device comprises a suction needle and an aeration needle arranged parallel thereto which both project into the eluant container. The eluant is suctioned through the generator column via the suction needle for instance by a vacuum prevailing in the eluate container. The amount of air or protective gas which corresponds to the suctioned amount of eluant is supplied to the eluant container via the aeration needle.

According to the preferred embodiment of the invention, the shifting device comprises a support and a slide element which is shiftably arranged thereto. While the slide element is attached to the receptacle, the support is firmly connected to the fixing device for the needles.

In an advantageous embodiment of the invention the eluant container is a small septum bottle with an opening occluded by a pierceable stopper made of elastic material. Thus, it is possible to advantageously pierce the stopper with the suction needle or the aeration needle through the stopper without the danger of any liquid leaking out. It is thus possible to arrange the small septum bottle so that its opening points downwards.

According to a specific embodiment of the invention, the receptacle for the eluant container is a hollow cylinder having approximately the same length as the small septum bottle and whose cylindrical interior space is essentially adapted to the external dimension of the small septum bottle. The preferred embodiment thereof is that the small septum bottle is arranged in the receptacle in such a way that it maintains its position during operation.

The receptacle advantageously comprises an exterior casing, said casing serving as a slide element. This casing may be a sliding material, for instance rubber.

According to a further embodiment of the invention, the support is integrally connected to a base plate and has the essential form of a hollow cylinder whose dimensions are chosen in such a way that the receptacle is shiftable within the support. A screw connection or a slide-blocking casing of the receptacle or a lining of the cylindrical support has the advantage that the receptacle can be shifted into any position within the support. In order to secure the relative position of the container and the support, a fixing screw may be provided in the support, said fixing screw being screwable radially and inwards and pressing against the receptacle or the container.

According to the invention, the base plate comprises a recess near the cylinder axis of the support, which recess receives the fixing device.

Hereinafter the invention is explained in more detail by means of the Figures.

DETAILED DESCRIPTION OF THE DRAWINGS

Figure 1:
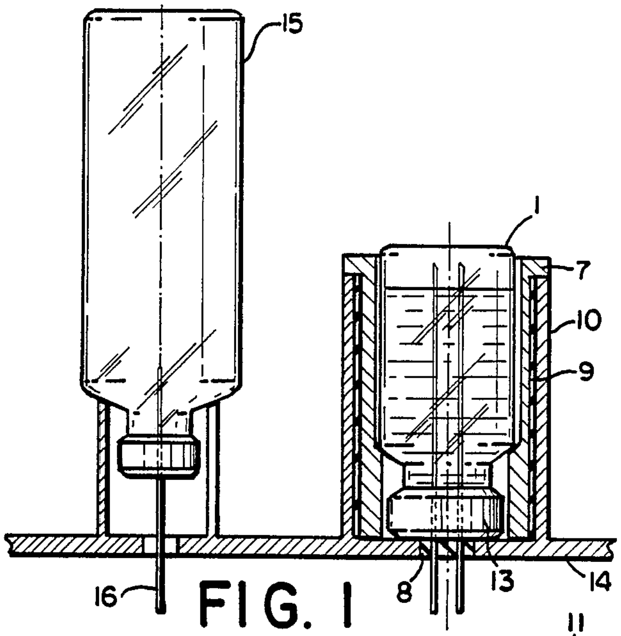
FIG. 1 shows an embodiment of the dispensing device according to the invention, the elution volume being minimal.

The embodiment of the invention shown in the Figures comprises a small septum bottle 1 in a hollow-cylindrical receptacle 7, the opening 12 of which points downwards. The opening 12 of the small septum bottle 1 is occluded with a stopper 13 made of pierceable, elastic material. A suction needle 4 and, if necessary, an aeration needle 6 project through the stopper 13 essentially parallel to the longitudinal axis 5 of the small septum bottle or the hollow-cylindrical receptacle 7. The needles 4 and 6 may be fixed at the base plate 14 by means of a fixing device 8, their tips 3 and 2 pointing upwards. This can for instance be done by means of a stopper-like disk which is made of elastic material and inserted into the aperture of the base plate, the needles 4 and/or 6 being pierced through the disk 8. As an alternative the needles may be fixed to the disk by means of an adhesive; in this case the disk need not be made of a pierceable material, butr should be provided with holes for receiving the needles. As a third alternative the holes of the disk may be provided with internal threads and the needles should at least partially be provided with an external thread so that the needles can be screwed into the holes of the disk.

Figure 2:
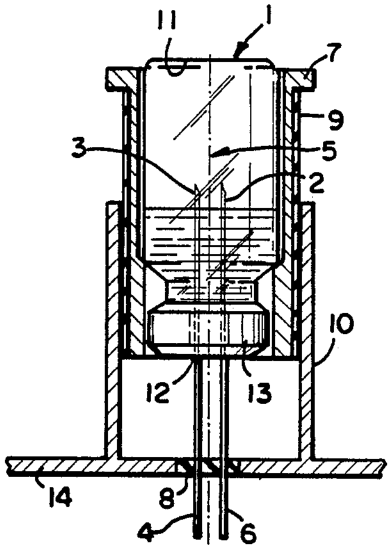
FIG. 2 shows the dispensing device according to FIG. 1, the elution volume being in the medium range.
Figure 3:
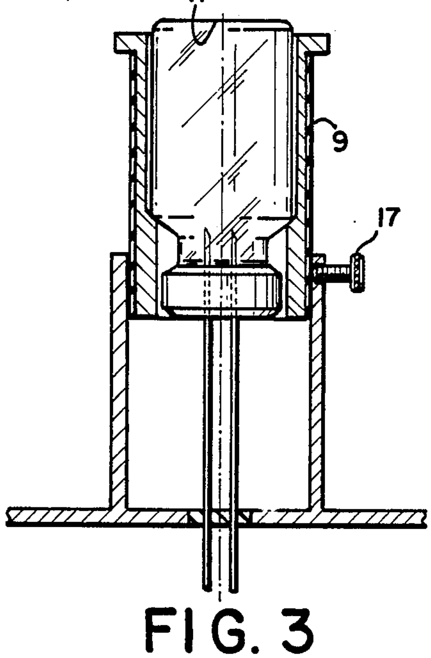
FIG. 3 shows the dispensing device according to FIG. 1, the elution volume being maximal.

A hollow-cylindrical support 10 is concentrically arranged around the fixing device 8. The internal dimensions of said support essentially correspond to the external dimensions of the receptacle. The receptacle is arbitrarily shiftable within the support in frictional connection or in form closure and is fixable in any position by means of a cooperating internal and external thread at the support 10 and the receptacle 7 or a slide-blocking casing 9 which coats the external surface of the receptacle 7, or a fixing screw 17 screwable into the support casing. As can be taken from FIGS. 1 to 3, the receptacle 7 and thus the small septum bottle 1 is arbitrarily adjustable between a lower end position (FIG. 1) and an upper end position (FIG. 3). When the adjustment is performed in the direction of the longitudinal axis of the needles, the tips 3, 2 of the needles 4, 6, respectively, project either to the bottom 11 of the small septum bottle 1 or only approximately to the opening 12 of the small septum bottle 1. Thus the piercing depth of the suction needle and the aeration needle 4, 6 into the small septum bottle is arbitrarily variable by means of this dispensing device. Since it is only possible to suction the solution over the tip of the needle, the volume of the eluant can be advantageously changed by altering the piercing depth.

The piercing depth and the volume to be eluated are just about reciprocally proportional to each other (if the cross-section of the small septum bottle is constant), as illustrated by the schematic Figures. When the piercing depth is great, only a small volume is suctioned via the suction needle 4 and generator column (not shown) as well as the needle 16 into a small, evacuated collecting bottle 15 (FIG. 1). If the dispensing device is fixed at a medium piercing depth, a correspondingly greater volume of the fluid is suctioned off (FIG. 2). The maximum elution volume is achieved at the minimum piercing depth (FIG. 3).

The device according to the present invention has the advantage that only a specific amount of eluant is flushed through the generator column,(not shown) between the small septum bottle and the small collecting bottle independent of the vacuum prevailing in the small, evacuated bottle 15 at the beginning of the process of elution. Preferably the amount of eluant is to be exactly adjusted by means of a scale provided at the receptacle.

Apart from the described embodiment of the invention it is also possible to rigidly secure the small collecting bottle and to adjust the needles in their height, instead, so that the piercing depth can be varied. It is also possible to arrange the eluant container in an upright fashion, i.e. the opening of the container points upwards and the needles project into the eluant container from the top to the bottom.

Although the invention has been described in detail in connection with an eluant container for radionuclide generators, it is also possible to use the invention in any kind of dispensed evacuatable containers in addition to this preferred application.

What is claimed is:

1. A dispensing apparatus for radionuclide generators comprising:

a container having a liquid eluant therein;

at least one hollow needle sealingly and shiftably attached to the container, a tip of said needle projecting into said container; and means for limiting the amount of eluant in said container which is available for elution by arbitrarily fixing and shifting the at least one needle relative to the container whereby the projection of the tip of the at least one needle into the container can be changed.

2. The dispensing apparatus of claim 1 wherein said fixing and shifting means further comprises:

a receptacle adapted to the form of said container and disposed to receive said container;

a fixing device which holds the at least one needle at a distance from its tip; and shifting means for allowing the fixing device and receptacle to be moved relative to each other along the longitudinal axis of the at least one needle between an upper and lower end position such that the tip of the at least one needle projects into the container approximately to the bottom of the container in the lower end position and approximately to the opposite end of the container in the upper end position.

3. The apparatus of claim 1 wherein said at least one needle further comprises a suction needle and an aeration needle.

4. The apparatus of claim 2 whereby said at least one needle further comprises a suction needle and an aeration needle.

5. The apparatus of claim 2 wherein said shifting means further comprises:

a support for the receptacle; and a slide element shiftably arranged with respect to the support and attached to the receptacle.

6. The apparatus of claim 2 wherein said container comprises a small septum bottle having a pierceable stopper of elastic material which occludes a small opening of the bottle.

7. The apparatus of claim 6 wherein said receptacle comprises a hollow cylinder having approximately the same length as the small septum bottle and whose cylindrical interior space is adapted to the external dimension of the small septum bottle.

8. The apparatus of claim 5 wherein said container comprises a small septum bottle having a pierceable stopper of elastic material which occludes a small opening of the bottle.

9. The apparatus of claim 8 wherein said receptacle comprises a hollow cylinder having approximately the same length as the small septum bottle and whose cylindrical interior space is adapted to the external dimension of the small septum bottle.

10. The apparatus of claim 9 wherein said slide element comprises a casing at the exterior of said hollow cylinder.

11. The apparatus of claim 10 wherein said apparatus further comprises a base plate and said support is integrally connected to said base plate, said support comprising a second hollow cylinder whose length approximately corresponds to the length of the receptacle and whose internal cross-section approximately corresponds the the external cross-section of the casing of the receptacle.

12. The apparatus of claim 11 wherein the receptacle is shiftably disposed within the support.

13. The apparatus of claim 11 wherein the base plate comprises a recess near the cylindrical axis of the support, which recess receives the fixing device.

14. The apparatus of claim 12 wherein the base plate comprises a recess near the cylindrical axis of the support, which recess receives the fixing device.

* * * * *